Jan. 19, 1960 V. P. DONNER ET AL 2,921,800
JOINT FOR CONNECTING A PAIR OF MEMBERS
Filed Sept. 20, 1957 2 Sheets-Sheet 1
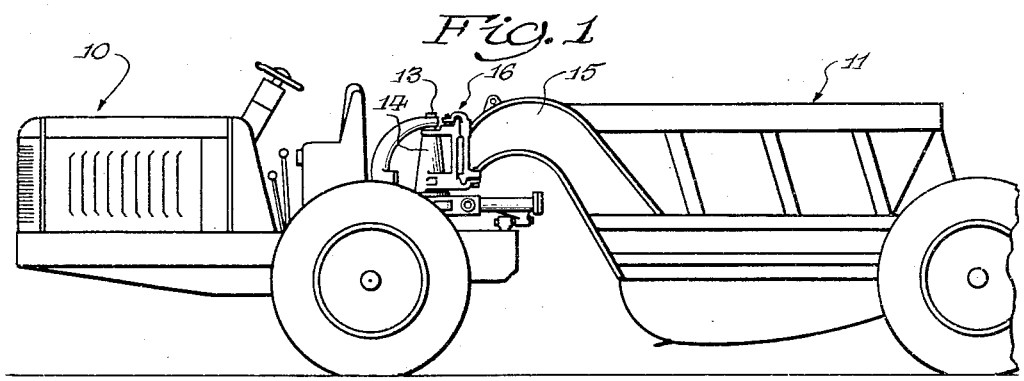
Fig. 1
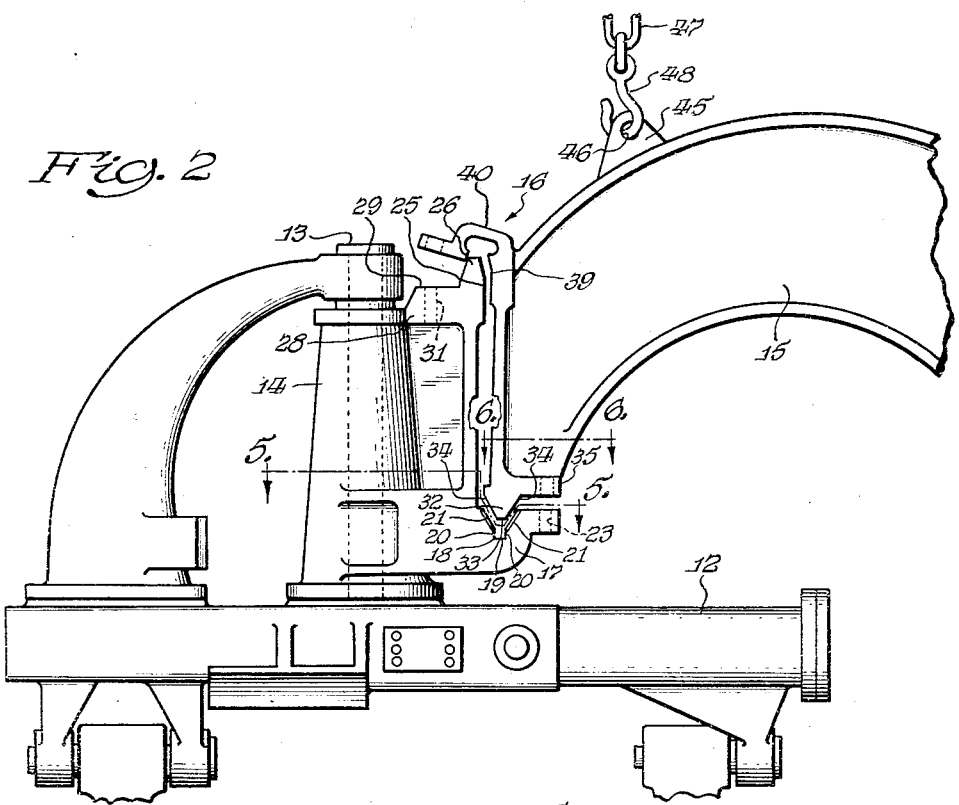
Fig. 2
Fig. 5
Fig. 6
Inventors
Verne P. Donner
George S. Allin, Sr.
George S. Allin, Jr.
Paul O. Pippel
Attorney

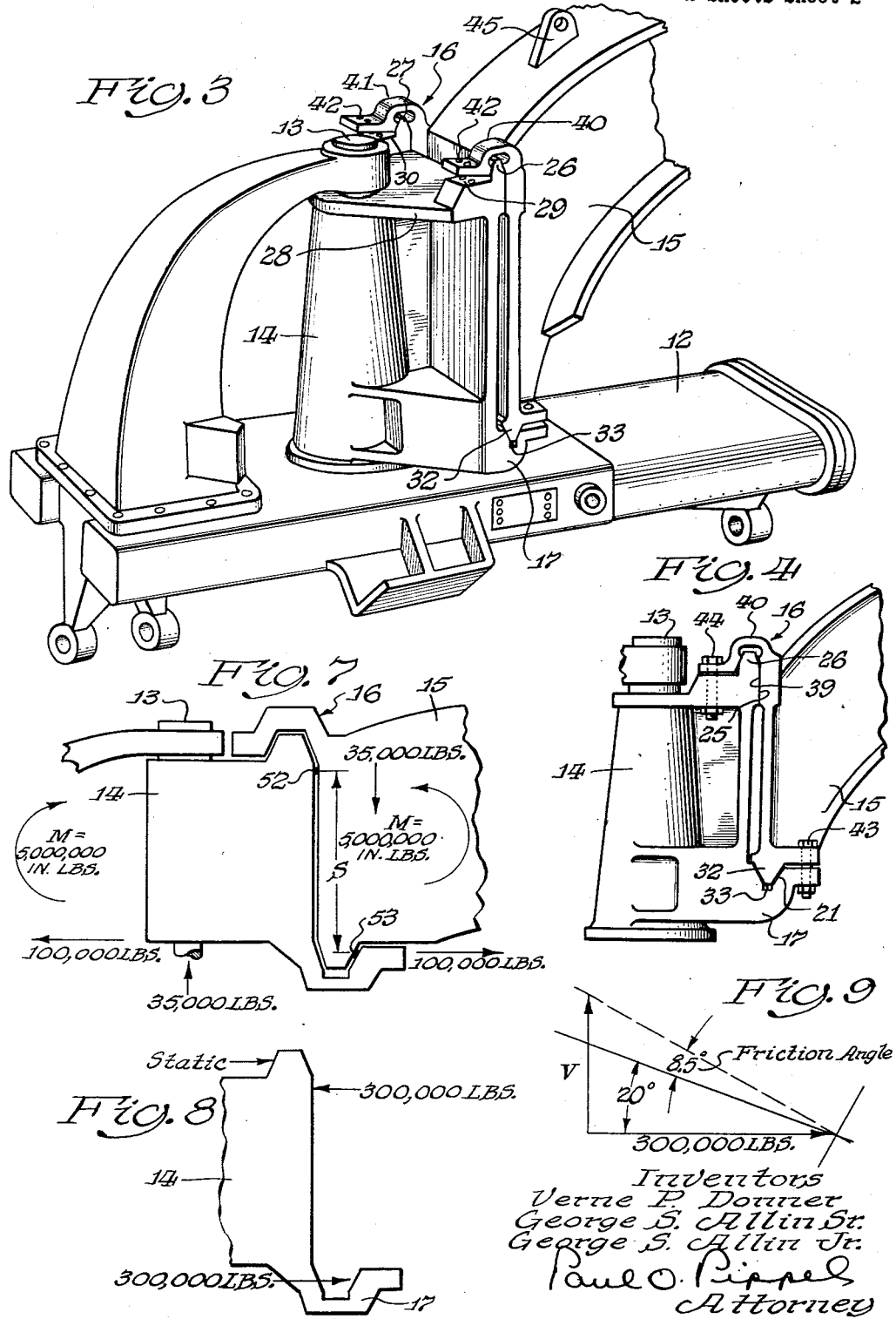

United States Patent Office 2,921,800
Patented Jan. 19, 1960

2,921,800

JOINT FOR CONNECTING A PAIR OF MEMBERS

Verne P. Donner, Palatine, George S. Allin, Sr., Flossmoor and George S. Allin, Jr., Homewood, Ill., assignors to International Harvester Company, Chicago, Ill., a corporation of New Jersey Application September 20, 1957, Serial No. 685,165

3 Claims. (Cl. 280—495)

This invention relates to joints for connecting a pair of members together and is primarily concerned with a joint for connecting a trailing vehicle to a prime mover vehicle.

An object of the invention is to provide a joint for connecting a pair of members together which will not work loose.

Another object of the invention is to provide a joint for connecting a pair of members together wherein all loads are taken through the joint structure rather than through bolts.

A further object of the invention is to provide a joint for connecting a trailing vehicle to a prime mover vehicle so constructed and arranged as to make it easy to change from one type of trailing vehicle to another type of trailing vehicle.

Another object of the invention is to provide a joint for connecting very heavy trailing vehicles to a heavy balanced type two-wheel prime mover, that is self-sustaining for static loads without bolts. This provides a very safe unit so that the final bolting to handle dynamic loads can be done safely.

The foregoing and other objects of the invention will be apparent from the construction and arrangement illustrated in the accompanying drawings, wherein:

Figure 1 is a side elevational view of a two-wheel tractor and two-wheel scraper connected together by the joint of the present invention;

Figure 2 is a side elevational view showing the gooseneck of the scraper being lowered into contact with the tractor so that the joint of the present invention is formed;

Figure 3 is a perspective view of the spindle and hollow member and joint after the gooseneck is lowered into contact with the tractor;

Figure 4 is a side elevational view of the spindle and hollow member and joint after the bolts have been placed in holes in the joint;

Figure 5 is a view taken on the line 5—5 of Figure 2;

Figure 6 is a view taken on the line 6—6 of Figure 2;

Figure 7 is a side elevational view of the spindle and hollow member and joint showing the loading on the joint;

Figure 8 is a side elevational view of that part of the joint on the tractor showing the loading thereon; and Figure 9 is a force diagram.

In the past it has been the practice to have a spindle mounted on the tractor and a hollow member integral with the gooseneck of the scraper. When it was desired to disconnect the scraper from the tractor the hollow member was lifted off the spindle. It is not desirable to remove the hollow member because so much adjustment of the bearings between the spindle and the hollow member is required each time the hollow member is removed from the spindle. Another means of connecting the scraper to the tractor was to separate the hollow member from the gooseneck of the scraper and have a vertical plate on the hollow member and a vertical plate on the outer end of the gooseneck and secure these vertical plates together by means of horizontal bolts extending through the vertical plates. This type of joint is not desirable because it requires a large number of bolts to withstand the forces involved and it is physically difficult to position a bolt pattern for a large number of bolts plus providing adequate strength surrounding each bolt so that each bolt carries its share of the load.

The invention proposes a joint primarily for connecting a trailing vehicle to a prime mover vehicle although it may have other uses. The joint is comprised of a support secured to the prime mover vehicle and the support is provided with a groove having walls converging from one face of the support toward the bottom of the groove. The joint further includes a rib arranged in parallel relation with and disposed above the support and secured to the prime mover vehicle. A wedge is secured to the trailing vehicle and is disposed in the groove in the support and a strap is disposed above the wedge and is secured to the trailing vehicle and is positioned on the rib. This joint has the advantages that it will not work loose and all loads are taken through the joint structure rather than through bolts and the joint is so constructed and arranged that it is easy to change from one type of trailing vehicle to another type of trailing vehicle.

In the drawings, 10 generally designates a prime mover vehicle or two-wheel tractor connected to a trailing vehicle or two-wheel scraper 11. The steering apparatus for the tractor is designated at 12 and the tractor carries a spindle 13 and a hollow member 14 is disposed on the spindle. The scraper 11 has a gooseneck 15 in the form of an inverted channel. The joint for connecting the scraper 11 to the tractor 10 is generally designated 16. The joint 16 is comprised of a support 17 integral with the hollow member 14 and provided with a groove 18 having a bottom 19 and sides including parallel walls 20 contiguous with the bottom and walls 21 converging from the upper face of the support toward the bottom of the groove and merging with the walls 20. The support 17 is also provided with three holes 22 located centrally thereof and holes 23 and 24 located adjacent each side thereof. A pad 25 is disposed above the support 17 and is integral with the hollow member 14. A pair of ribs 26 and 27 are arranged in spaced aligned relation with respect to each other and are disposed above the support 17 and are integral with the hollow member 14. A web 28 is formed integral with the hollow member 14 and raised portions of material 29 and 30 are formed integral with the web and with their respective ribs 26 and 27 and each raised portion is provided with a pair of holes 31. A wedge 32 has a lower wall 33 and downwardly converging walls 34 contiguous with the wall 33. A strip 35 is disposed behind the wedge 32 and is formed integral with the gooseneck 15 and is provided with three holes 36 located centrally thereof and holes 37 and 38 located adjacent each side thereof. A pad 39 is disposed above the wedge 32 and is formed integral with the gooseneck 15. A pair of spaced straps 40 and 41 are disposed above the pad 39 and are formed integral with the pad and each strap is provided with a pair of holes 42. Bolts 43 are disposed in the aligned holes 22 and 36 in the support 17 and the strip 35 and other bolts 43 are disposed in the aligned holes 23 and 37 in the support and strip and still other bolts 43 are disposed in the aligned holes 24 and 38 in the support and strip. Bolts 44 are disposed in the aligned holes 31 and 42 in the raised portion 29 and strap 40 and other bolts 44 are disposed in the aligned holes 31 and 42 in the raised portion 30 and strap 41.

When disconnected from the scraper 11 the front end of the tractor 10 rests on a block or wheeled dolly not shown in the drawings. The gooseneck 15 of the scraper 11 has a lifting plate 45 integral therewith and the lifting plate is provided with a hole 46. A crane has a chain 47 depending therefrom and a hook 48 is disposed on the end of the chain. To connect the scraper 11 to the tractor 10 assuming that the tractor rests on the block the hook 48 is hooked into the hole 46 of lifting plate 45 and the crane lifts the gooseneck 15 of the scraper and then lowers it so that wedge 32 is disposed in groove 18 and pad 39 is in abutting relation with pad 25 and straps 40 and 41 are disposed over the ribs 26 and 27. The bolts 43 are then disposed in the holes in the support 17 and strap 35 and tightened and the bolts 44 are disposed in the holes in the raised portions 29 and 30 and straps 40 and 41 and tightened. The walls 21 of the groove 18 in the support are provided with integral pads 49, 50 and 51 upon which the wedge 32 rests.

A typical example of the type of loading for a 22 cubic yard scraper connected to a two-wheel tractor would be a moment of 5,000,000 inch pounds and a direct horizontal load of 100,000 pounds and 35,000 pounds vertical load.

If this load is carried by a joint wherein one vertical plate is fixed to the hollow member and another vertical plate is fixed to the outer end of the gooseneck and horizontal bolts extend through these two vertical plates to secure them together the solution of this joint would be as follows: The bolt load due to moment $$\frac{M}{S} = \frac{5,000,000\#}{25''} = 200,000\#$$

200,000# plus a direct load of 100,000# = 300,000#. If each 1¼" bolt can carry 50,000#, then $$\left(\frac{300,000\#}{50,000\#}/\text{bolt} = 6 \text{ bolts necessary}\right)$$

If a factor of safety of 1.5 is required then 1.5×6 or 9 bolts are necessary for this joint.

Considering the joint of the present invention and comparing the number of bolts necessary to carry the identical loads and referring to Figure 7 in this connection, the loading is taken in compression at points 52 and 53. Therefore, the only bolt load necessary to make this joint carry the same loads as before, is to provide a vertical force which will produce a horizontal wedging load equal to the 300,000#. See Figure 8. Assuming a .15 coefficient of friction and a 20° wedge angle then the required vertical force (V) to obtain 300,000# would be V=300,000 tan 28.5°=163,000#. Assuming that each 1¼" bolt could carry 50,000#, then $$\frac{163,000}{50,000} = 3.26 \text{ bolts}$$

See Figure 9. Again using a 1.5 factor of safety 5 bolts would be required. Thus, 5 bolts with the wedge can carry the same loads as 9 bolts pure tension.

It is physically difficult to position a bolt pattern of 9 bolts plus providing adequate strength surrounding each bolt so that each bolt carries its share of the load. With the wedge connection only 5 bolts located across the entire bottom section of the gooseneck provide a well distributed load pattern with excellent accessibility for torquing the bolts. Bolts 44 must be provided at the top of the joint for static load. Ordinarily bolts must be provided on the sides of the gooseneck for turning moments. The latter bolts are not required when the wedge connection is used since the wedges at the outside edges will carry these loads. The maximum loading at the top of the joint 16 is compression between pads 25 and 39. The maximum load at the bottom of the joint 16 is tension transmitted through bending stress at groove 18. The bolts 43 preload the wedge 32 so that deflection does not occur to loosen the joint. The bolts 44 preload the top of the joint so that tension loads do not deflect the parts. The tractor 10 will pull the scraper 11 on smooth terrain without the bolts 43 being in the holes in the support and strip and without the bolts 44 being in the holes in the straps and the raised portions.

The joint of the present invention may be used on a C-shaped frame. The C-shaped frame has the free ends of its legs pivotally mounted on a crawler tractor intermediate the ends thereof and the frame passes around the front of the crawler tractor. A grader blade is pivotally connected to the C-shaped frame centrally of the bight of the frame. The C-shaped frame is separated into two parts and this separation occurs at a location slightly spaced from the center of the bight of the farme. The joint of the present invention may be used to connect the two parts of the C-shaped frame together. The support is integral with the part of lesser length and the support is located on the side of the part next to the space interiorly of the frame. The wedge is integral with the part of greater length and is located on the side of the part next to the space interiorly of the frame. The wedge is disposed in the groove in the support and the support is bolted to the part of greater length. The ribs are integral with the opposite side of the part of lesser length and the straps are integral with the opposite side of the part of greater length and the straps enclose the ribs and are bolted to the part of lesser length. The C-shaped frame is made into two parts to reduce the amount of space it takes up when shipped in a railway freight car.

The joint of the present invention has the advantages that it will not work loose and all loads are taken through the joint structure rather than through bolts. The joint is so constructed and arranged that it is easy to change from one type of trailing vehicle to another type of trailing vehicle. There are several different types of trailing vehicles such as gun carriages, scrapers, tank retrievers, low bed trailers, logging vehicles and rocker wagons.

What is claimed is:

1. Means for connecting a scraper having a gooseneck to a tractor having a spindle and a hollow member disposed on the spindle comprising a support secured to the hollow member and provided with a groove having walls converging from one face of the support toward the bottom of the groove and provided with a plurality of spaced holes, a rib arranged in parallel relation with and disposed above the support and secured to the hollow member, a wedge secured to the gooseneck and disposed in the groove in the support, a strip disposed adjacent the wedge and secured to the gooseneck and provided with a plurality of holes equal in number to the holes in the support and in registry with the holes in the support, plate means disposed adjacent the rib and secured to the hollow member and provided with a plurality of holes, a strap secured to the gooseneck and provided with a plurality of holes equal in number to the number of holes in the plate means and in registry with the holes in the plate means, bolts disposed in the holes in the support and the strip, and bolts disposed in the holes in the strap and the plate means.

2. Means for connecting a scraper having a gooseneck to a tractor having a spindle and a hollow member disposed on the spindle comprising a support secured to the hollow member and provided with a groove having walls converging from one face of the support toward the bottom of the groove and provided with a plurality of spaced holes, a pad disposed above the support and secured to the hollow member, a pair of ribs arranged in spaced aligned relation with respect to each other and arranged in parallel relation with and disposed above the support and secured to the hollow member, a raised portion of material disposed adjacent each of the ribs and secured to the hollow member and each raised portion being provided with a plurality of holes, a wedge secured to the gooseneck and disposed in the groove in the support, a strip disposed adjacent the wedge and secured to the gooseneck and provided with a plurality of holes equal in number to the holes in the support and in registry with the holes in the support, a pad disposed above the wedge and secured to the gooseneck and engaging the pad on the hollow member, a pair of spaced straps disposed above the pad on the gooseneck and secured to the gooseneck and each being provided with a plurality of holes equal in number to the number of holes in each raised portion and in registry with the holes in the respective raised portion, bolts disposed in the holes in the support and the strip, and bolts disposed in the holes in the straps and the raised portions.

3. Means for connecting a scraper having a gooseneck to a tractor having a spindle and a hollow member pivotally disposed on the spindle comprising a support secured to the hollow member and provided with a transversely extending groove having walls converging from one face of the support toward the bottom of the groove, a rib arranged in parallel relation with and disposed above the support and secured to the hollow member, a wedge secured to the gooseneck and disposed in the groove in the support, plate means disposed adjacent the rib and secured to the hollow member and provided with a plurality of holes, a strap secured to the gooseneck and provided with a plurality of holes equal in number to the number of holes in the plate means and in registry with the holes in the plate means, and bolts disposed in the holes in the strap and the plate means.

References Cited in the file of this patent

UNITED STATES PATENTS

| | | |
|---|---|---|
| 2,362,262 | French | Nov. 7, 1944 |
| 2,369,579 | Kobligk | Feb. 13, 1945 |
| 2,473,375 | Hyler | June 14, 1949 |
| 2,636,568 | Rutishauser | Apr. 28, 1953 |